United States Patent
Sambandam et al.

(10) Patent No.: US 10,623,438 B2
(45) Date of Patent: Apr. 14, 2020

(54) DETECTING EXECUTION OF MODIFIED EXECUTABLE CODE

(71) Applicant: McAfee, Inc., Santa Clara, CA (US)

(72) Inventors: Venkata Ramanan Sambandam, Santa Clara, CA (US); Carl D. Woodward, Santa Clara, CO (US); Dmitri Rubakha, Santa Clara, CA (US); Steven L. Grobman, El Dorado Hills, CA (US)

(73) Assignee: McAfee, LLC, Santa Clara, CA (US)

( * ) Notice: Subject to any disclaimer, the term of this patent is extended or adjusted under 35 U.S.C. 154(b) by 113 days.

(21) Appl. No.: 15/392,770

(22) Filed: Dec. 28, 2016

(65) Prior Publication Data

US 2018/0183814 A1 Jun. 28, 2018

(51) Int. Cl.
 H04L 29/06 (2006.01)
 G06F 21/56 (2013.01)
 G06F 12/0802 (2016.01)

(52) U.S. Cl.
 CPC .......... H04L 63/145 (2013.01); G06F 21/56 (2013.01); G06F 21/565 (2013.01); G06F 21/566 (2013.01); H04L 63/1425 (2013.01); G06F 12/0802 (2013.01)

(58) Field of Classification Search
 CPC ... H04L 63/145; H04L 63/1425; G06F 21/56; G06F 21/565; G06F 21/566; G06F 12/0802
 See application file for complete search history.

(56) References Cited

U.S. PATENT DOCUMENTS

| | | | | |
|---|---|---|---|---|
| 7,380,278 | B2 * | 5/2008 | Ellison | G06F 9/468 380/44 |
| 7,895,654 | B1 * | 2/2011 | Millard | G06F 21/564 709/229 |
| 8,196,206 | B1 * | 6/2012 | Gartside | H04L 63/145 726/24 |
| 8,370,938 | B1 * | 2/2013 | Daswani | G06F 21/562 726/23 |
| 8,683,584 | B1 * | 3/2014 | Daswani | G06F 21/577 726/22 |
| 2004/0172551 | A1 * | 9/2004 | Fielding | G06F 21/564 726/24 |
| 2006/0191011 | A1 * | 8/2006 | Korkishko | G06F 21/566 726/24 |
| 2011/0138389 | A1 * | 6/2011 | Molnar | G06F 11/3466 718/100 |

(Continued)

OTHER PUBLICATIONS

International Searching Authority, "Search Report and Written Opinion," issued in connection with PCT patent application No. PCT/US2017/068610, dated Mar. 7, 2018, 13 pages.

*Primary Examiner* — Yonas A Bayou
(74) *Attorney, Agent, or Firm* — Hanley, Flight & Zimmerman, LLC

(57) ABSTRACT

A technique for detecting malware uses hardware capabilities of the processing element of a programmable device to detect modification of executable code during execution. By monitoring a dirty bit in page tables, pages that have been modified can be detected, allowing analysis of those pages during execution. An indication may then be passed to an anti-malware software to analyze the executable further.

25 Claims, 8 Drawing Sheets

(56) References Cited

U.S. PATENT DOCUMENTS

| | | | |
|---|---|---|---|
| 2012/0291126 A1* | 11/2012 | Lagar-Cavilla | G06F 21/56 726/22 |
| 2013/0097708 A1* | 4/2013 | Jayanthi | G06F 21/554 726/25 |
| 2013/0347109 A1* | 12/2013 | Fluhrer | G06F 21/12 726/23 |
| 2015/0082438 A1* | 3/2015 | Prieto Alvarez | G06F 16/951 726/23 |
| 2016/0098561 A1* | 4/2016 | Keller | G06F 21/554 726/24 |
| 2016/0283717 A1 | 9/2016 | Lemay et al. | |

* cited by examiner

DETECTING EXECUTION OF MODIFIED EXECUTABLE CODE

TECHNICAL FIELD

Embodiments described herein generally relate to the detection of malware and in particular to techniques for detecting malware by detecting modification of executable code during execution.

BACKGROUND ART

Proactive detection of malicious software, is a constant battle between anti-malware improvements and malware improvements, with each reacting to changes in the tactics and capabilities of the other, with attackers constantly evolving and evading existing defenses. Many approaches have been attempted in response to the problem of malware, each of which have positive and negative aspects. Some of the approaches previously tried include file inspection, file reputation checking, behavioral monitoring, whiteli sting, host-based intrusion prevention systems, network-based intrusion prevention systems, access protection, application control, sandboxing, etc. But malware continues to find ways to evade all of those techniques.

For example, the trustworthiness of a process/application can be determined based on many factors such as threat information of the binary, command line parameters, code signature or certificate, trustworthiness of the parent process etc. But what if a vulnerability of a trustworthy application is exploited to run a malicious payload? For example, one known malware example uses vulnerabilities in Microsoft's Internet Explorer® browser to rewrite code thereby making the browser execute a malicious payload. (INTERNET EXPLORER is a registered trademark of Microsoft Corporation.)

Polymorphic malware is another class of malware that changes its signature to evade detection by anti-malware programs. Packed malware is a type of malware that has been modified using a compression and/or encryption program. This compressed payload is appended or prepended to an executable containing the code to decompress it during runtime. This poses challenges to scanning engines as the malicious payload is encrypted.

For re-evaluating trust of processes, there are not many effective methods that are in practice. Most of the current approaches employ launch time evaluation without any effective runtime re-evaluations. There are a few solutions that deal with packers by emulating or detonating the binary in sandboxed environment. But advanced packers employ techniques like time bombs, polymorphism, environment awareness, etc. to render such techniques ineffective. Other techniques require reverse engineering and understanding how different packers work, which involves manual research and does not work for new packers or custom packers.

Improved techniques for detecting malware would be desirable.

DESCRIPTION OF EMBODIMENTS

Figure 1:
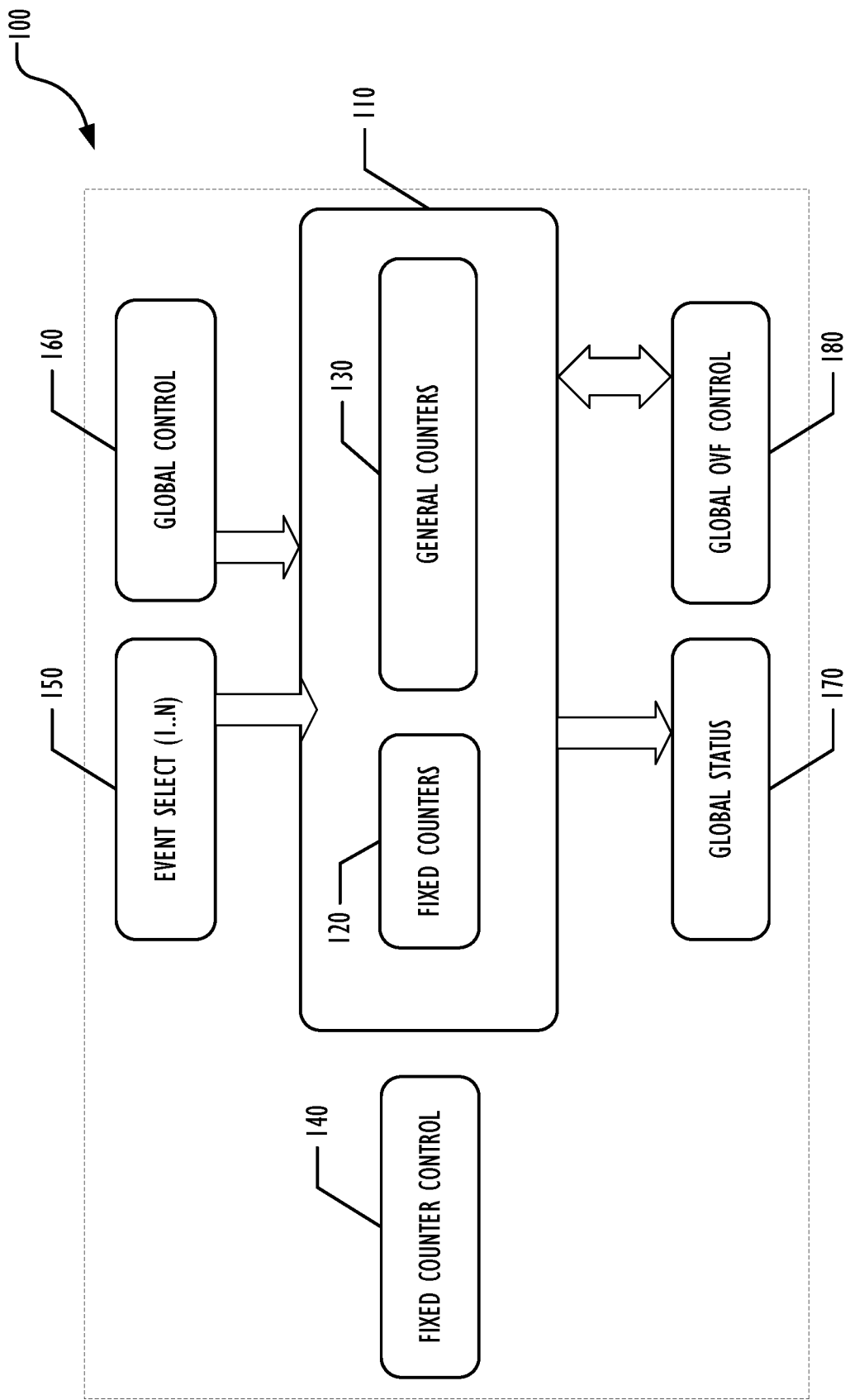
FIG. 1 is a flowchart illustrating a technique for detecting malware through persistence of startup hooks.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a computer system" can refer to a single computer or a plurality of computers working together to perform the function described as being performed on or by a computer system.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one."

The term "or" means any of the alternatives and any combination of the alternatives, including all of the alternatives, unless the alternatives are explicitly indicated as mutually exclusive.

The phrase "at least one of" when combined with a list of items, means a single item from the list or any combination of items in the list. The phrase does not require all of the listed items unless explicitly so defined.

As used herein, the term "a computer system" can refer to a single computer or a plurality of computers working together to perform the function described as being performed on or by a computer system. As used herein, the term "a programmable device" can refer to a single programmable device or a plurality of programmable device working together to perform the function described as being performed on or by a programmable device. Programmable devices include any device that includes one or more programmable processing elements, including desktop computers, laptop computers, smart phones, tablets, network devices, Internet of Things devices, etc.

As used herein, the term "processing element" can refer to a single hardware processing element or a plurality of hardware processing elements that together may be programmed to perform the indicated actions. The hardware processing elements may be implemented as virtual hardware processing elements of a virtual programmable device hosted on a physical hardware device. Instructions that when executed program the processing element to perform an action may program any or all of the processing elements to perform the indicated action. Where the processing element is one or more multi-core processors, instructions that when executed program the processing element to perform an action may program any or all of the multiple cores to perform the indicated action.

As used herein, the term "malware" can refer to any software used to disrupt operation of a programmable device, gather sensitive information, or gain access to private systems or networks. Malware includes computer viruses (including worms, Trojan horses, etc.), Bots, ransomware, spyware, adware, scareware, and any other type of malicious program.

As used herein, the term "medium" can refer to a single physical medium or a plurality of media that together store the information described as being stored on the medium.

As used herein, the term "memory" can refer to a single memory device or a plurality of memory devices that together store the information described as being stored on the medium. The memory may be any type of storage device, including random access memory, read-only memory, optical and electromechanical disk drives, etc.

As used herein, the term "startup item" or "startup hook" are used interchangeably to refer to any object or technique that configures an operating system of a programmable device to start an application upon a reboot of the operating system.

Embodiments may be implemented in one or a combination of hardware, firmware, and software. Embodiments may also be implemented as instructions stored on a computer-readable storage medium, which may be read and executed by at least one processing element to perform the operations described herein. A computer-readable storage medium may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

Embodiments, as described herein, may include, or may operate on, logic or a number of components, modules, or mechanisms. Modules may be hardware, software, or firmware communicatively coupled to one or more processing elements in order to carry out the operations described herein. Modules may be hardware modules, and as such, modules may be considered tangible entities capable of performing specified operations and may be configured or arranged in a certain manner. Circuits may be arranged (e.g., internally or with respect to external entities such as other circuits) in a specified manner as a module. The whole or part of one or more programmable devices (e.g., a stand-alone client or server computer system) or one or more hardware processing elements may be configured by firmware or software (e.g., instructions, an application portion, or an application) as a module that operates to perform specified operations. The software may reside on a machine readable medium. The software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Where modules are temporarily configured, each of the modules need not be instantiated at any one moment in time. For example, where the modules comprise a general-purpose hardware processing element configured using software; the general-purpose hardware processing element may be configured as respective different modules at different times. Software may accordingly program a hardware processor, for example, to constitute a particular module at one instance of time and to constitute a different module at a different instance of time. Modules may also be software or firmware modules, which operate to perform the methodologies described herein.

Modern computer processing elements have a Performance Monitoring Unit (PMU) for monitoring behavioral data about selected events. The diagram in FIG. 1 illustrates the core PMU and related registers 100 on Intel x86 processors. Processors from different manufacturers may have similar PMUs, although architectural details may differ. The PMU 110 has a plurality of fixed purpose counters 120. Each fixed purpose counter 120 can count only one architectural performance event, thus simplifying the configuration part. In addition to the fixed purpose counters 120, the Core PMU also supports a plurality of general purpose counters 130 that are capable of counting any activity occurring in the core. Each Core PMU 110 also has a set of control registers 140, 160, to assist with programming the fixed purpose counters 120 and general purpose counters 130. The PMU 110 also has Event Select registers 150 that correspond to each fixed purpose counter 120 and general purpose counter 130, which allows for specification of the exact event that should be counted. A global control register 160 allows enabling or disabling the counters 120, 130. A global status register 170 allows software to query counter overflow conditions on combinations of fixed purpose counters 120 and general purpose counters 130. A global overflow control register 180 allows software to clear counter overflow conditions on any combination of fixed-purpose counters 120 and general purpose counters 130. The elements illustrated in FIG. 1 are illustrative and by way of example only, and other elements and arrangements of elements may be provided as desired.

Figure 2:
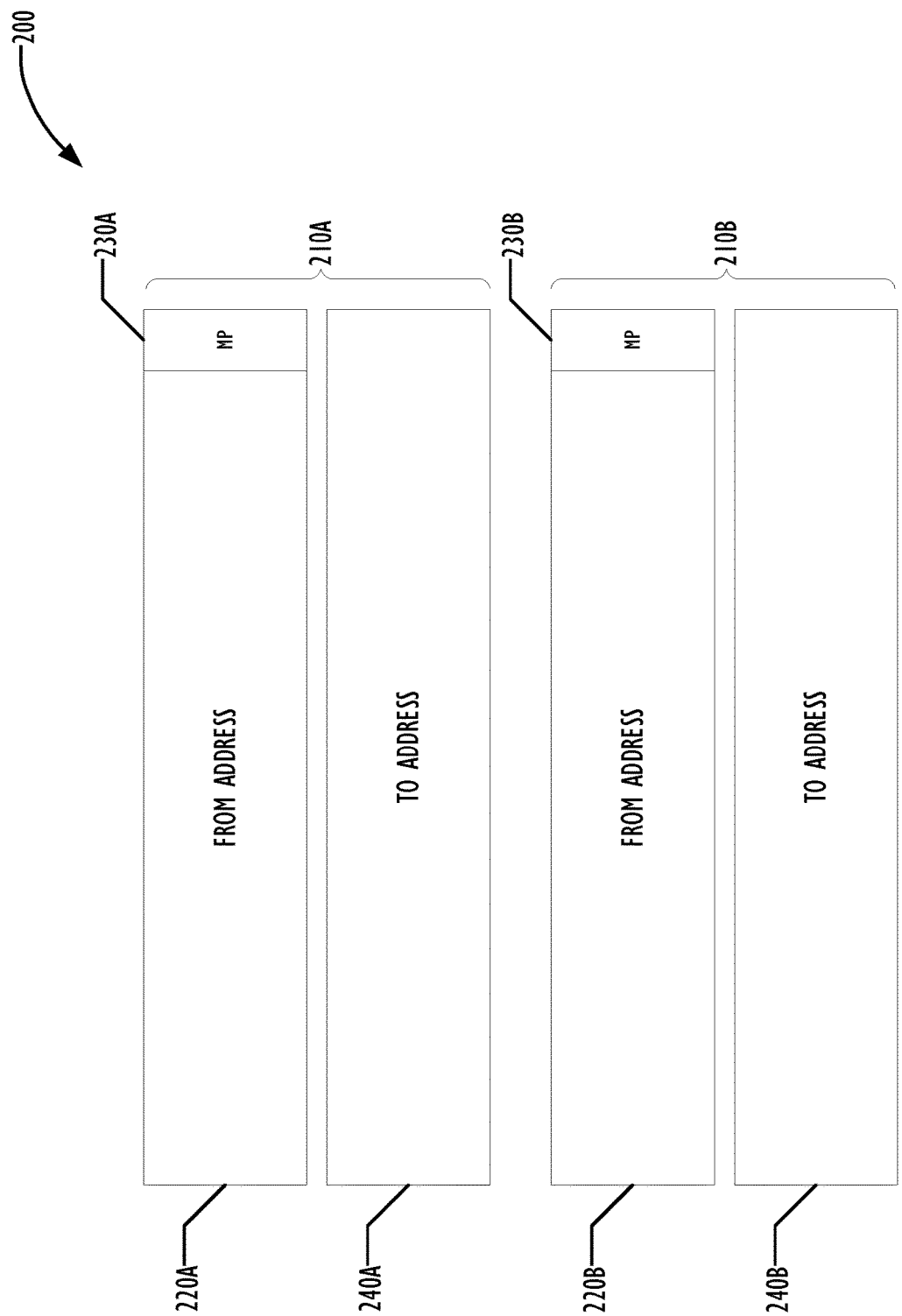
FIGS. 2-3 are block diagrams illustrating a programmable device for use with techniques described herein.

Modern processor architectures also provide a branch recording mechanism. Typically, the last branch recording mechanism tracks not only branch instructions (like JMP, Jcc, LOOP, and CALL instructions), but also other operations that cause a change in the instruction pointer, like external interrupts, traps, and faults. The branch recording mechanisms generally employ a set of processor model specific registers, referred to as a last branch record (LBR) stack, each entry of which stores a source address and a destination address of the last branch, thus the LBR stack provides a record of recent branches. Some embodiments of an LBR stack may also record an indication of whether the branch was mispredicted, i.e., one or more of the target of the branch and the direction (taken, not taken) was mispredicted. In addition, control registers may allow the processor to filter which kinds of branches are to be captured in the LBR stack. FIG. 2 is a block diagram illustrating an LBR stack 200 with two sets of registers 210A and 210B. Each LBR stack entry 210 includes one register with a from address field 220 and a mispredicted indicator 230, and another register with a to address field 240. Although only 2 LBR stack entries 210 are illustrated in the LBR stack 200 of FIG. 2 for clarity, implementations typically have more LBR stack entries 210. Although illustrated with the mispredict indicator as part of the register containing the from address 220, embodiments may place the mispredict indicator as part of the register containing the to address 240, or may place the mispredict indicator in a third register (not shown in FIG. 2). Other fields may be included in the LBR stack 200 as desired.

In addition, in some processor architectures, the operating system (OS) configures the paging hardware by storing the base address of the page table in a control register such as the cr3 register used in some Intel instruction set architectures. The page table may be organized in levels for memory optimization reasons. In some implementations, a last level page table contains page table entries (PTEs) that describes various properties and states of the memory page, including an indication of whether the page has been modified.

Figure 3:
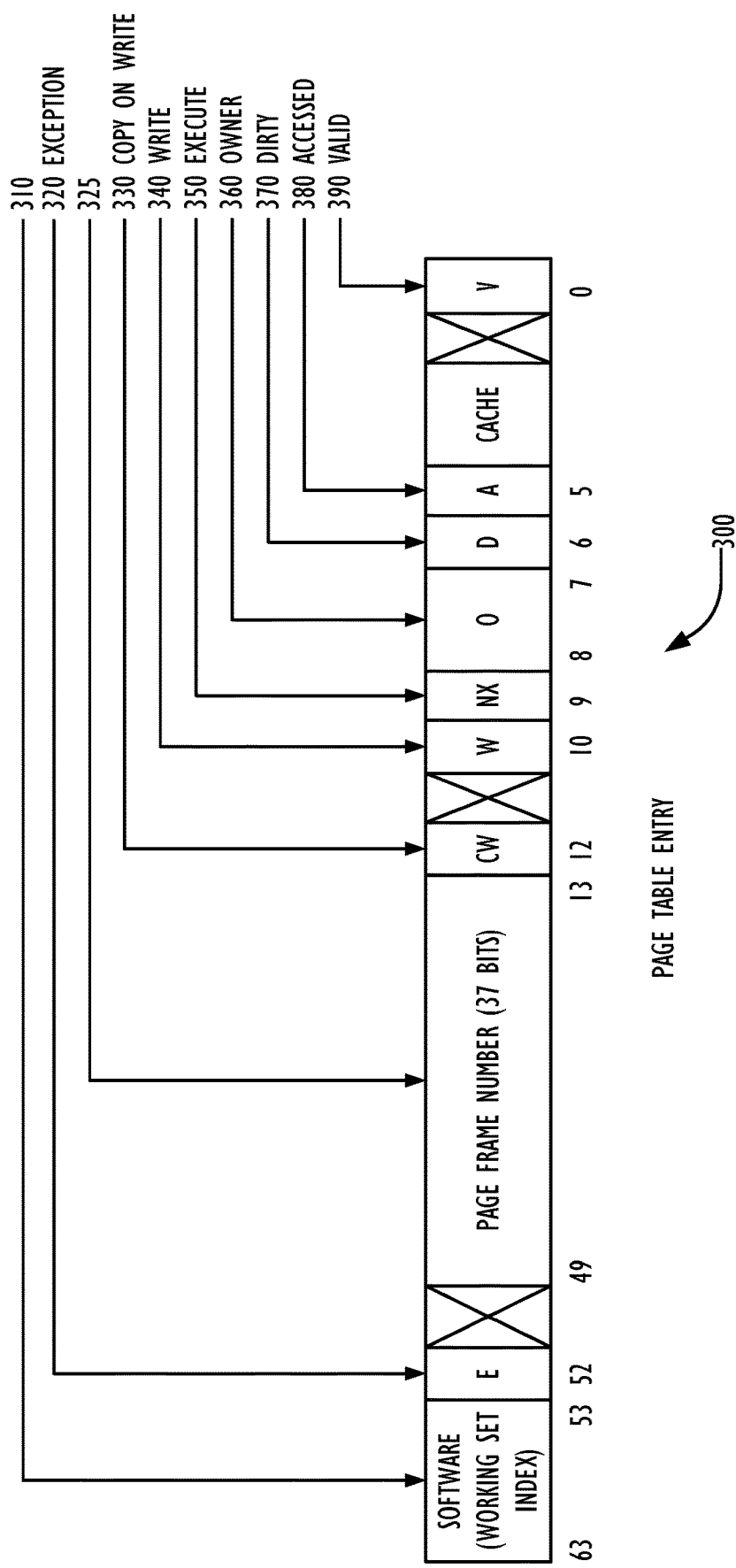

FIG. 3 illustrates a structure for a PTE 300 according to the Intel IA-64 architecture. The PTE in this example is a 64-bit data structure. Fields 310-360 and 380-390 are used by page table handling processes, but are not important for the purposes of this disclosure, so are not described further. At position 6 in the PTE 300 is the dirty bit 370. The dirty bit 370 allows for a paging performance optimization. A page on disk that is paged in to physical memory, read from, then subsequently paged out again does not need to be written back to disk, because the page has not been changed; the copy on the backing store remains valid. However, if the page was written to after being paged in, the page's dirty bit 370 will be set by the hardware, indicating that the page is "dirty," i.e., that the page has changed since loading into memory and must be written back to the backing store. Although the page table entry of FIG. 3 is for a specific instruction set architecture, the use of a dirty bit or bits to indicate a page has been modified may be implemented in other architectures. Some architectures may use more than one bit for indicating that a page is dirty. The techniques described below use the dirty bit 370 to track the executable pages that are modified after being loaded by the OS.

These techniques can generate near real-time triggers to various reputation and scanning engines when any modified code has been executed. The triggers would include execution of unpacked payload (potentially packers) and execution of code in a process address space which has been modified during run-time (potentially exploits).

The techniques described below monitor a running process using the PMU 100, and during each PMU-generated trap, check the dirty bit of the PTE 300 to see if the page that is currently executing has been modified. Further changes to the already dirty pages can be tracked by a software driver that handles the PMU traps. The driver could also make use of other contextual information about the current page maintained by the memory manager of the OS. For example, in the Microsoft Windows® OS the executable bit and copy-on-write bit, etc. of the Virtual Address Descriptor (VAD) tree structure can be utilized to further understand the nature of the page. (WINDOWS is a registered trademark of Microsoft Corporation.)

The OS kernel doesn't set the dirty bit when the modules are set up for execution after relocation, fixing import-export address tables, etc. while being loaded in a virtual address space for execution. After the introduction of address space layout randomization, the fixups are done on the fly by patching the bytes of the executable file as they are read off the disk and the kernel skips setting the dirty bit. By waiting to set the dirty bit, this avoids the paging subsystem from creating as many copies of a module in the page-file as there are processes that used the module. Any changes that are made to the modules after the loading completes are then tracked by the paging hardware to perform paging efficiently. This allows us to identify executable pages that are modified after being loaded by the kernel.

Although the description below is written in terms of monitoring the process for memory modification by the PMU 100, other process monitoring techniques could be used, including (a) programmable interval timers, such as Intel Corporation's Advanced Programmable Interrupt Controller timer; (b) tracing OS traps, such as page fault, scheduler traps, wait on dispatcher object, etc.; (c) hypervisor-based code hooking; and (d) in-line hooking. However, the use of the PMU 100 provides an effective, efficient, and OS-independent approach.

The PMU 100 provides the ability to track the occurrence of micro-architectural events which expose some of the behavior of the code as it is executed. For example, the PMU 100 can be configured to interrupt the processing element whenever branch misprediction happens or when any call or jump is executed, etc.

Various embodiments configure the PMU 100 to trace the certain PMU events for all the code executed in user mode. PMU logic allows counting configured events and enabling a performance management interrupt (PMI) once the counter reach a predetermined threshold. This provides additional hardware-supported sensitivity control to setting a sampling rate for particular events. In one embodiment, the threshold value may be empirically determined, based on analysis of known exploits and packers. In some embodiments, the threshold value may be configured based on a policy. The sampling rate of the events is a tradeoff between performance and accuracy. The lower the sampling rate, the lower will be the detection rate, but also the lower will be the performance impact on the system. Similarly, the higher the sampling rate, the higher will be the detection rate, and the higher will be the performance impact on the system. In one embodiment, the PMU 100 is configured to use a sampling rate that generates a PMI after every 20,000 tracked events, but any other sampling rate could be used as desired. Different processing elements may use different sampling rates, based on the performance-effectiveness tradeoff, which may be empirically determined.

In one embodiment, the following PMU events are programmed for tracing by the PMU 100, trapping CALL and JMP type instructions:
    NEAR_REL_CALL—Capture near relative calls.
    NEAR_IND_CALL—Capture near indirect calls.
    NEAR_IND_JMP—Capture near indirect jumps.
    NEAR_REL_JMP—Capture near relative jumps.

Different PMU implementations may identify the specific events differently and may have other CALL/JMP type instructions that may be trapped by the PMU 100. These PMU events are by way of example only, and other PMU events could be used in addition to or instead of these PMU events.

Figure 4:
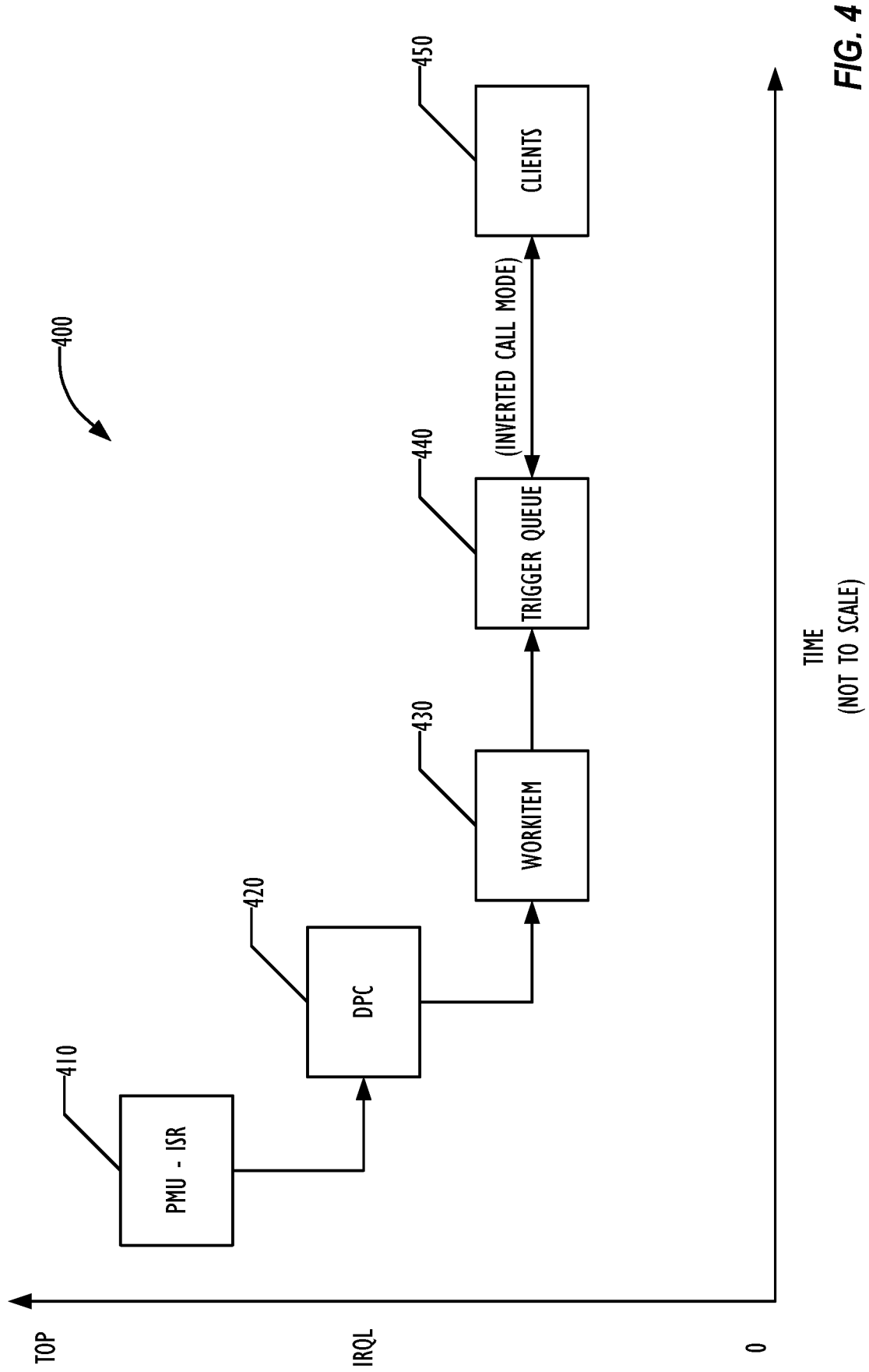
FIG. 4 is a block diagram illustrating a network of programmable devices according to one embodiment.

Once PMU 100 is configured to capture the above calls and jumps and a sampling rate is picked, a software driver would be invoked via an interrupt service routine when a user mode code makes calls and jumps. The address that is being executed is passed as contextual data by the PMU. In one embodiment, the process context is available by the virtue of the fact that the PMU interrupts are handled in the context of the process that executed the CALL or JMP instruction. FIG. 4 is a block graph 400 illustrating a sequence events in a Windows implementation; a similar sequence would occur in other environments such as a Linux environment. The y-axis illustrates various interrupt levels, while the x-axis illustrates the sequencing of the events. The block graph 400 is not drawn to scale, and no significance should be given to specific horizontal or vertical positioning along either axis relative to the axis, other than the farther the object is from the y origin, the higher the interrupt priority, and the farther the object is from the x origin, the greater the amount of time that has transpired since the initial PMI.

Some exploits work by exploiting any vulnerability in the application like use after free, buffer overflow, etc. to overwrite any of the executable code with the malicious payload. As described earlier, the dirty bit for these modified pages would be set in the corresponding PTE to optimize paging. Packers (e.g., UPX, aspack, etc.) have the compressed and encrypted payload as part of the binary and an algorithm to in-line decrypt the payload. When executed, the decrypt algorithm gets executed first which decrypts the payload and then transfers control to the actual entry point of the payload. As the decryption of the payload happens after the packer is loaded in memory by the OS for execution, the dirty pages of the destination pages will be set when the payload is decrypted. Therefore, the disclosed approach is useful both for detecting exploits attempting to overwrite executable code as well as detecting packed software.

The software driver configures the PMU 100 by setting appropriate Model Specific Register (MSR) bits to capture calls/jumps and configures the interrupt service routine (ISR) 410 for handling the PMU events. The first level filtering of the PMU events happens in the ISR 410 at a high priority, but the remainder of the processing takes place at a lower priority, to avoid the performance problems that would be caused by performing everything in the ISR 410. All the events that belongs to the pages whose dirty bit is not set will be excluded from further processing, leaving only those executable pages for which the dirty bit has been set. These dirty pages may be innocuous pages, such as pages used by just-in-time engines or runtime interpreted languages, and pages which may be an indication of possible malware, such as pages that are modified because of an exploit or because of packer's unpack operation. Any type of analysis may be used to determine whether the modified page is innocuous or is an indication of possible malware.

Further processing of these pages is handed off to code that runs at lower priority than the ISR (a Deferred Procedure Call (DPC) in case of Windows, tasklets in case of Linux). In an embodiment that determines whether modified pages are innocuous or indications of possible malware, the innocuous pages could be excluded in the DPC 420, for example, which can then queue a workitem 430 for further processing. In some embodiments, no attempt to exclude innocuous pages is made in the DPC 420, and all pages indicated by the PMIs are considered.

Other techniques for excluding Any other whitelisting could be done in the DPC 420. For example, the DPC 420 can exclude an entire process, etc. The DPC 420 runs at an intermediate priority between the ISR 410 and the other items, handing off the rest of the events are handed off to system threads running at normal priority for further analysis. In the example illustrated in FIG. 4, these threads are Windows workitems 430. In Linux, they would be workqueues, and in other operating systems, other types of system threads. In some embodiments, a portion of the work described as being done by the DPC 420 may be done in a secondary intermediate priority routine with a lower priority than the DPC 420, but a higher priority than the workitems 430. For example, in an embodiment that determines whether the modified page was legitimately modified and uses whitelists or blacklists to further eliminate modified pages from consideration, the evaluation to determine whether the code is legitimate page may be handled in the DPC 420, and whitelist processing handled in secondary intermediate priority routine. In one embodiment, the whitelist check determines whether code present in the page has been whitelisted or has been generated by a whitelisted module.

Although described above as employing whitelists, blacklists can also be used.

The workitems 430 generate and queue triggers for new pages to be examined. In one embodiment, a hash for the dirty pages may be computed by the workitems 430 and a process ID (pid) to dirty page hash data structure (not illustrated in FIG. 4) may be maintained. The pid-to-hash data structure allows skipping duplicate triggers if the content of the dirty page has not been changed from the last trigger. After filtering the above events, the rest of the events are added to a trigger queue 440 which is sent to clients 450 that can subscribe or register their intent to use the triggers in the trigger queue 440. The clients 450 may include either user mode or kernel mode clients or both. The format of the trigger queue and the trigger elements in the trigger queue may be any desired format and data structures. For example, the trigger queue may be a linked list. In one embodiment, the workitem uses an inverted call model to allow the workitem to call a user mode client.

The processing by the clients 450 that are triggered by the trigger queue can be any type of processing desired. In various embodiments, the clients 450 that subscribe for the triggers of the trigger queue 440 may be any of the following a) A process reputation engine that could act on the trigger by revising the trust score of the process which has been tampered.

b) A scanning engine that would improve its efficacy against packed malware samples by deferring the scan of packed binaries till the unpacked code starts executing.

c) A behavioral engine that consider the modified executable page event as one another interesting event to characterize the applications.

Figure 5:
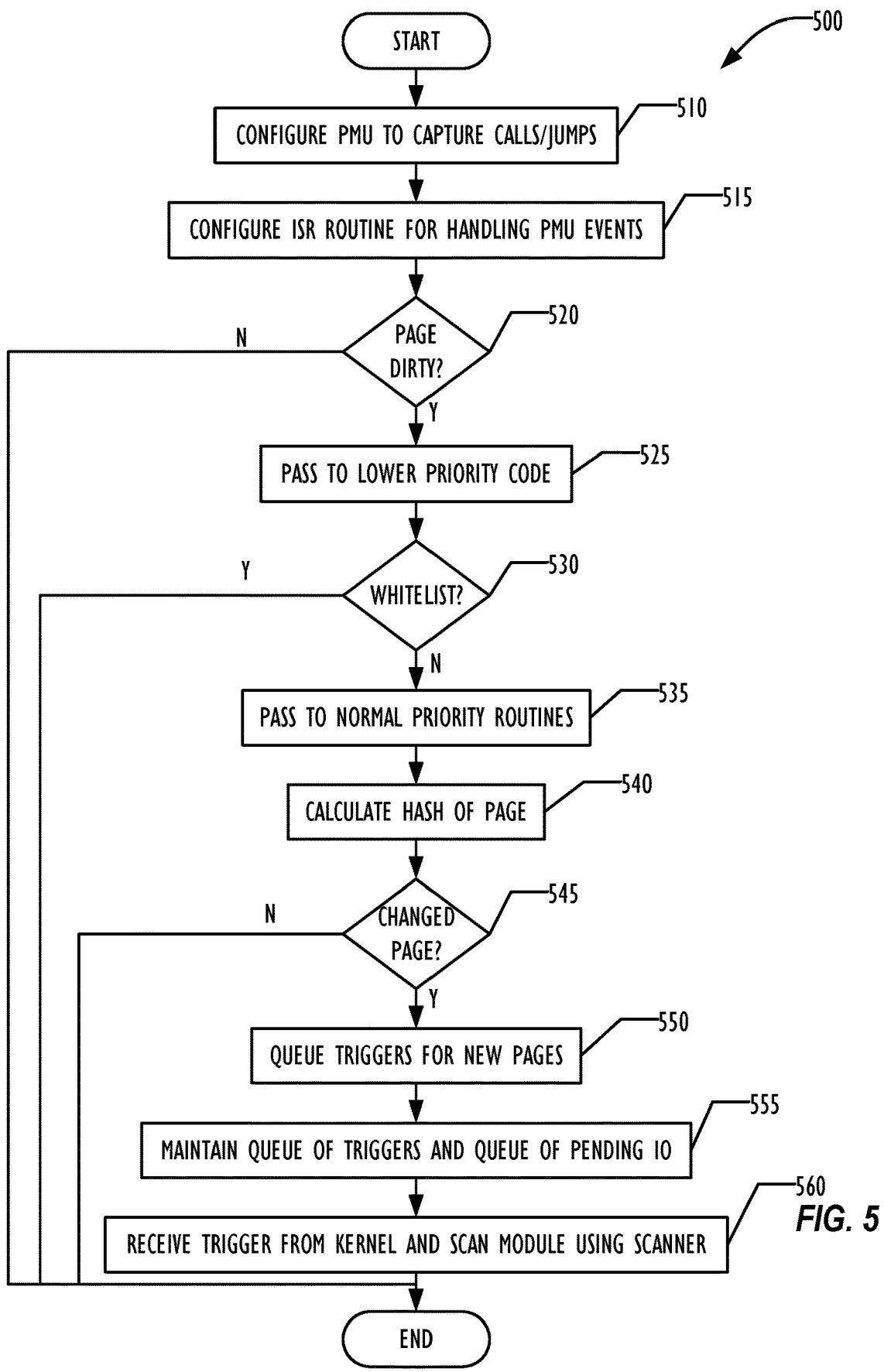
FIG. 5 is a flowchart illustrating a technique for using the PMU to generate triggers associated with modifying an executable page according to one embodiment.

FIG. 5 is a flowchart illustrating a technique 500 for using the PMU 100 to generate triggers associated with modifying an executable page according to one embodiment. In block 510, a driver routine configures the PMU 100 to capture a predetermined event, in some embodiments using a predetermined sampling rate, generating PMIs. In some embodiments, the PMU 100 is configured by setting values in MSRs to establish the event to be captured by the PMU 100, as well as the sampling rate. The PMU 100 may be configured to capture more than one event.

In block 515, the ISR 410 is configured to handle PMI events from the PMU 100. Upon receiving a PMI, the ISR 410 checks in block 520 to see if the page indicated in the program context received with the PMI has the dirty bit 370 set, indicate the page has been modified. If not, the page and interrupt can be ignored. If the dirty bit 370 is set, the page has been modified and information about the interrupt and context can be passed in block 525 to the DPC 420, running at a lower priority.

The DPC 420 may then use any desired technique to determine whether the page should be further examined. For example, in block 530, whitelist processing may be used to determine whether the process using the page is known to be safe and can be ignored, passing other pages on for further processing. Similarly, blacklist processing may be used to determine whether the process using the page is known to be unsafe and should be processed further, ignoring pages not in the blacklist. Embodiments may employ both whitelist and blacklist processing, if desired.

In block 535, if further processing is desired, the page can be passed to a normal priority routine, such as a Windows workitem 430, for that processing. In some embodiments, a further optimization may be employed by checking if the page has been changed since the last time it was processed by the malware detection technique. If not, the page can be ignored, as indicated in block 545, and only new pages or further changed pages may be processed further. In one embodiment, a hash is calculated of the page and stored in a hash table with other identifying information such as a process ID, as indicated in block 540. The hash may be calculated using any desired hashing technique. Other techniques than hashing may be used to detect changes in the page between its current state and a previously seen state.

In block 550, information about the page may be added to a trigger object and placed on the trigger queue 440. In one embodiment, in block 555 the trigger queue 440 is maintained by the operating system along with a queue of pending I/O. Client routines 450 may subscribe as to the trigger queue 440, so that the client routines 450 may be notified in block 560 by receiving a trigger from the operating system kernel about a new page that needs further analysis. The client routines 450 may be user mode routines that use an inverted call model to allow the operating system kernel to trigger them based on trigger queue objects. More than one client routine 450 may subscribe to the trigger queue 440 if desired.

As explained above, upon receiving the trigger from the trigger queue 440 in block 560, the clients 450 may perform any desired anti-malware analysis on the page, such as scanning the page to attempt to discover malware.

The techniques described above do not need to determine the exact location of the modification of the page, what kind of modification was made, or the effect of the modification. Analysis of the page can be left to the client routines 450. The techniques do, however, provide a simple and efficient way to identify occurrences of pages modified during execution of a process, using hardware and interrupt service routines, then quickly passing enough information to lower priority routines to determine whether to perform more detailed analysis, thereby improving the detection of malware in ways that may be difficult for malware to hide without significant degradations in performance.

Figure 6:
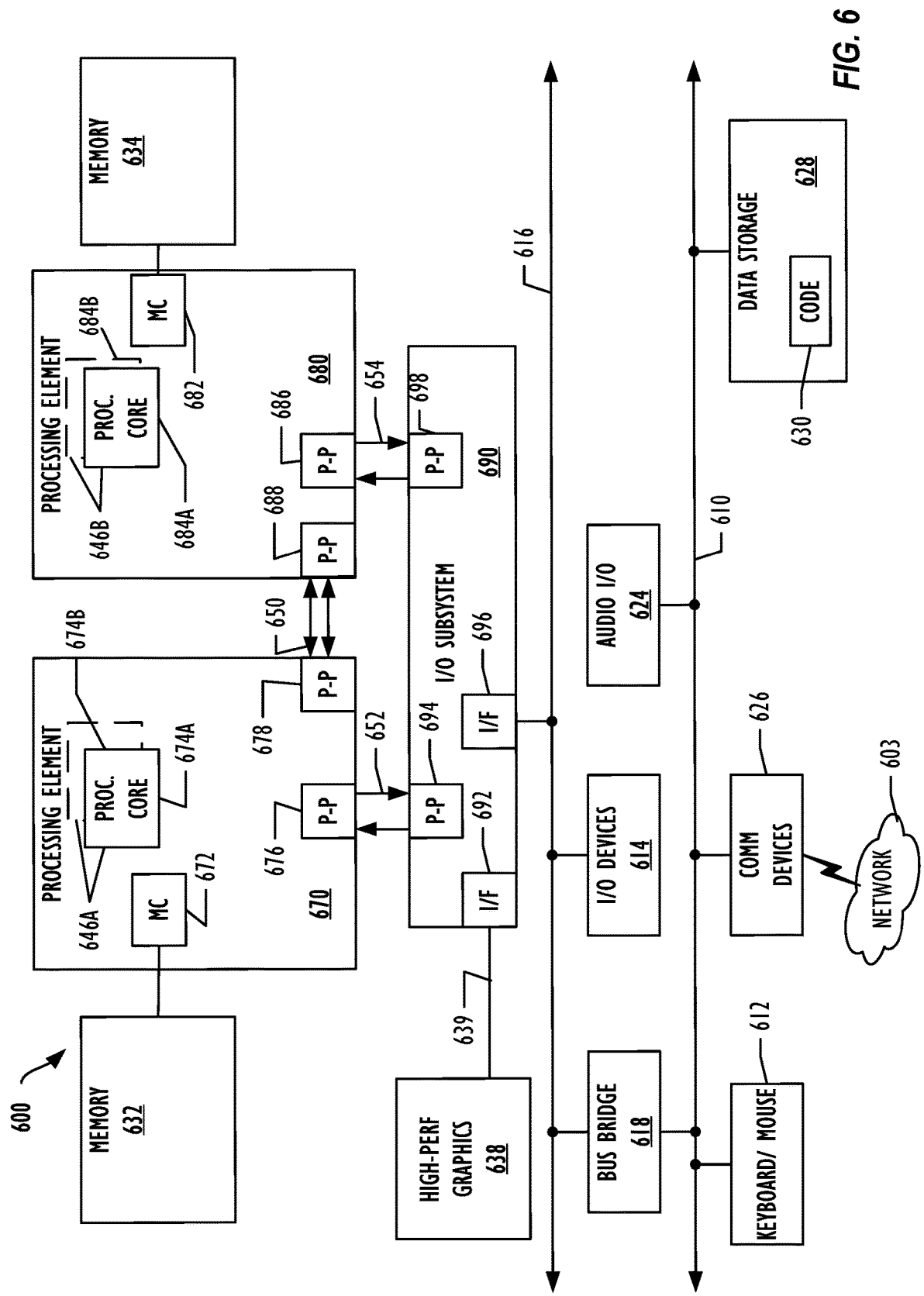
FIG. 6 is a block diagram illustrating a programmable device that may be used for implementing the techniques described herein in accordance with one embodiment.

Referring now to FIG. 6, a block diagram illustrates a programmable device 600 that may be used for implementing the techniques described herein in accordance with one embodiment. The programmable device 600 illustrated in FIG. 6 is a multiprocessor programmable device that includes a first processing element 670 and a second processing element 680. While two processing elements 670 and 680 are shown, an embodiment of programmable device 600 may also include only one such processing element.

Programmable device 600 is illustrated as a point-to-point interconnect system, in which the first processing element 670 and second processing element 680 are coupled via a point-to-point interconnect 650. Any or all of the interconnects illustrated in FIG. 6 may be implemented as a multi-drop bus rather than point-to-point interconnects.

As illustrated in FIG. 6, each of processing elements 670 and 680 may be multicore processors, including first and second processor cores (i.e., processor cores 674a and 674b and processor cores 684a and 684b). Such cores 674a, 674b, 684a, 684b may be configured to execute instruction code.

However, other embodiments may use processing elements that are single core processors as desired. In embodiments with multiple processing elements 670, 680, each processing element may be implemented with different numbers of cores as desired.

Each processing element 670, 680 may include at least one shared cache 646. The shared cache 646a, 646b may store data (e.g., instructions) that are utilized by one or more components of the processing element, such as the cores 674a, 674b and 684a, 684b, respectively. For example, the shared cache may locally cache data stored in a memory 632, 634 for faster access by components of the processing elements 670, 680. In one or more embodiments, the shared cache 646a, 646b may include one or more mid-level caches, such as level 2 (L2), level 3 (L3), level 4 (L4), or other levels of cache, a last level cache (LLC), or combinations thereof.

While FIG. 6 illustrates a programmable device with two processing elements 670, 680 for clarity of the drawing, the scope of the present invention is not so limited and any number of processing elements may be present. Alternatively, one or more of processing elements 670, 680 may be an element other than a processor, such as an graphics processing unit (GPU), a digital signal processing (DSP) unit, a field programmable gate array, or any other programmable processing element. Processing element 680 may be heterogeneous or asymmetric to processing element 670. There may be a variety of differences between processing elements 670, 680 in terms of a spectrum of metrics of merit including architectural, microarchitectural, thermal, power consumption characteristics, and the like. These differences may effectively manifest themselves as asymmetry and heterogeneity amongst processing elements 670, 680. In some embodiments, the various processing elements 670, 680 may reside in the same die package.

First processing element 670 may further include memory controller logic (MC) 672 and point-to-point (P-P) interconnects 676 and 678. Similarly, second processing element 680 may include a MC 682 and P-P interconnects 686 and 688. As illustrated in FIG. 6, MCs 672 and 682 couple processing elements 670, 680 to respective memories, namely a memory 632 and a memory 634, which may be portions of main memory locally attached to the respective processors. While MC logic 672 and 682 is illustrated as integrated into processing elements 670, 680, in some embodiments the memory controller logic may be discrete logic outside processing elements 670, 680 rather than integrated therein.

Processing element 670 and processing element 680 may be coupled to an I/O subsystem 690 via respective P-P interconnects 676 and 686 through links 652 and 654. As illustrated in FIG. 6, I/O subsystem 690 includes P-P interconnects 694 and 698. Furthermore, I/O subsystem 690 includes an interface 692 to couple I/O subsystem 690 with a high performance graphics engine 638. In one embodiment, a bus (not shown) may be used to couple graphics engine 638 to I/O subsystem 690. Alternately, a point-to-point interconnect 639 may couple these components.

In turn, I/O subsystem 690 may be coupled to a first link 616 via an interface 696. In one embodiment, first link 616 may be a Peripheral Component Interconnect (PCI) bus, or a bus such as a PCI Express bus or another I/O interconnect bus, although the scope of the present invention is not so limited.

As illustrated in FIG. 6, various I/O devices 614, 624 may be coupled to first link 616, along with a bridge 618 that may couple first link 616 to a second link 610. In one embodiment, second link 610 may be a low pin count (LPC) bus.

Various devices may be coupled to second link 610 including, for example, a keyboard/mouse 612, communication device(s) 626 (which may in turn be in communication with the computer network 603), and a data storage unit 628 such as a disk drive or other mass storage device which may include code 630, in one embodiment. The code 630 may include instructions for performing embodiments of one or more of the techniques described above. Further, an audio I/O 624 may be coupled to second link 610.

Note that other embodiments are contemplated. For example, instead of the point-to-point architecture of FIG. 6, a system may implement a multi-drop bus or another such communication topology. Although links 616 and 610 are illustrated as busses in FIG. 6, any desired type of link may be used. In addition, the elements of FIG. 6 may alternatively be partitioned using more or fewer integrated chips than illustrated in FIG. 6.

Figure 7:
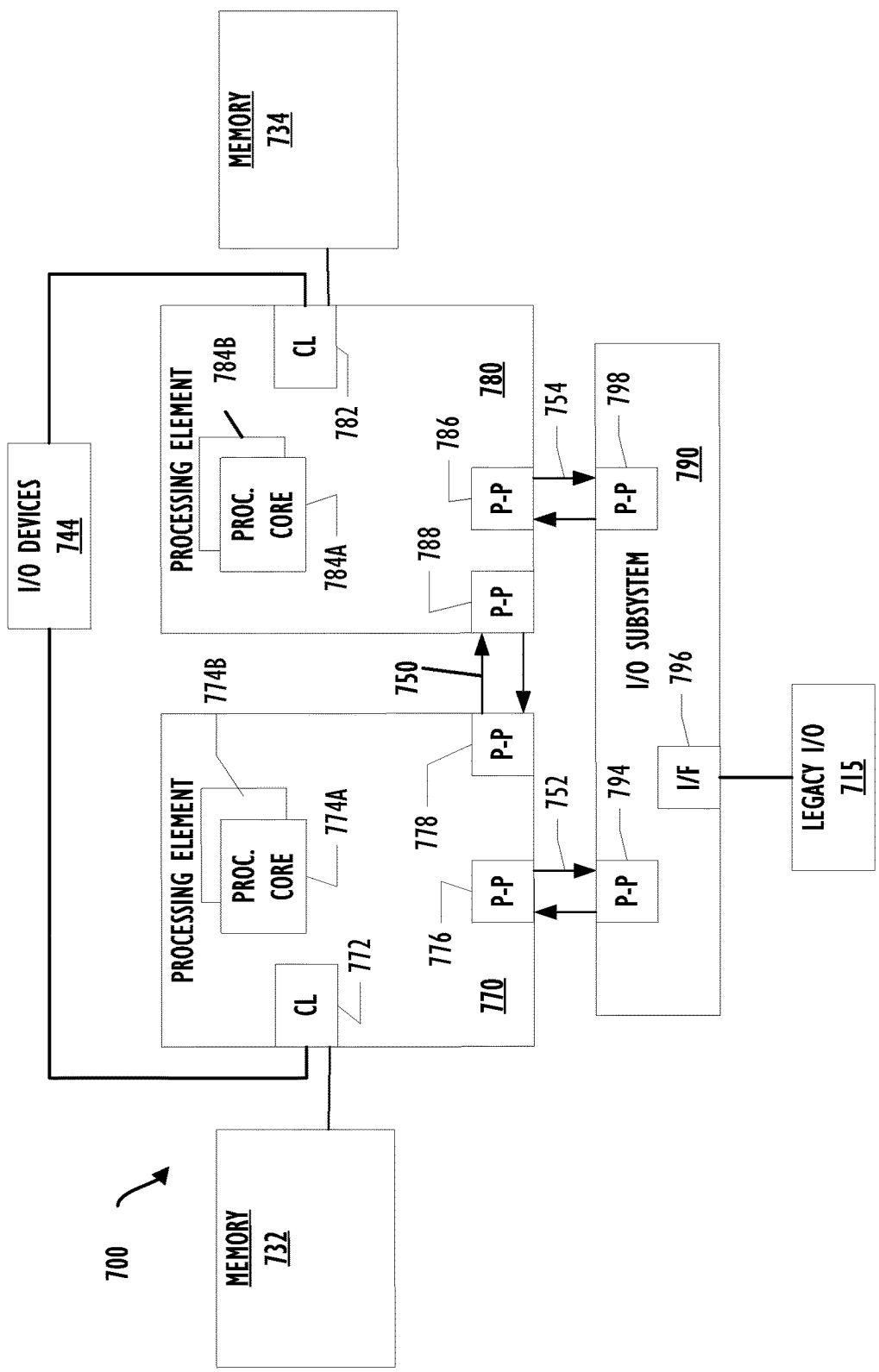
FIG. 7 is a block diagram illustrating a programmable device that may be used for implementing the techniques described herein in accordance with another embodiment.

Referring now to FIG. 7, a block diagram illustrates a programmable device 700 according to another embodiment. Certain aspects of FIG. 7 have been omitted from FIG. 7 in order to avoid obscuring other aspects of FIG. 7.

FIG. 7 illustrates that processing elements 770, 780 may include integrated memory and I/O control logic ("CL") 772 and 782, respectively. In some embodiments, the 772, 782 may include memory control logic (MC) such as that described above in connection with FIG. 6. In addition, CL 772, 782 may also include I/O control logic. FIG. 7 illustrates that not only may the memories 732, 734 be coupled to the CL 772, 782, but also that I/O devices 744 may also be coupled to the control logic 772, 782. Legacy I/O devices 715 may be coupled to the I/O subsystem 790 by interface 796. Each processing element 770, 780 may include multiple processor cores, illustrated in FIG. 7 as processor cores 774A, 774B, 784A and 784B. As illustrated in FIG. 7, I/O subsystem 790 includes point-to-point (P-P) interconnects 794 and 798 that connect to P-P interconnects 776 and 786 of the processing elements 770 and 780 with links 752 and 754. Processing elements 770 and 780 may also be interconnected by link 750 and interconnects 778 and 788, respectively.

The programmable devices depicted in FIGS. 6 and 7 are schematic illustrations of embodiments of programmable devices that may be utilized to implement various embodiments discussed herein. Various components of the programmable devices depicted in FIGS. 6 and 7 may be combined in a system-on-a-chip (SoC) architecture.

Figure 8:
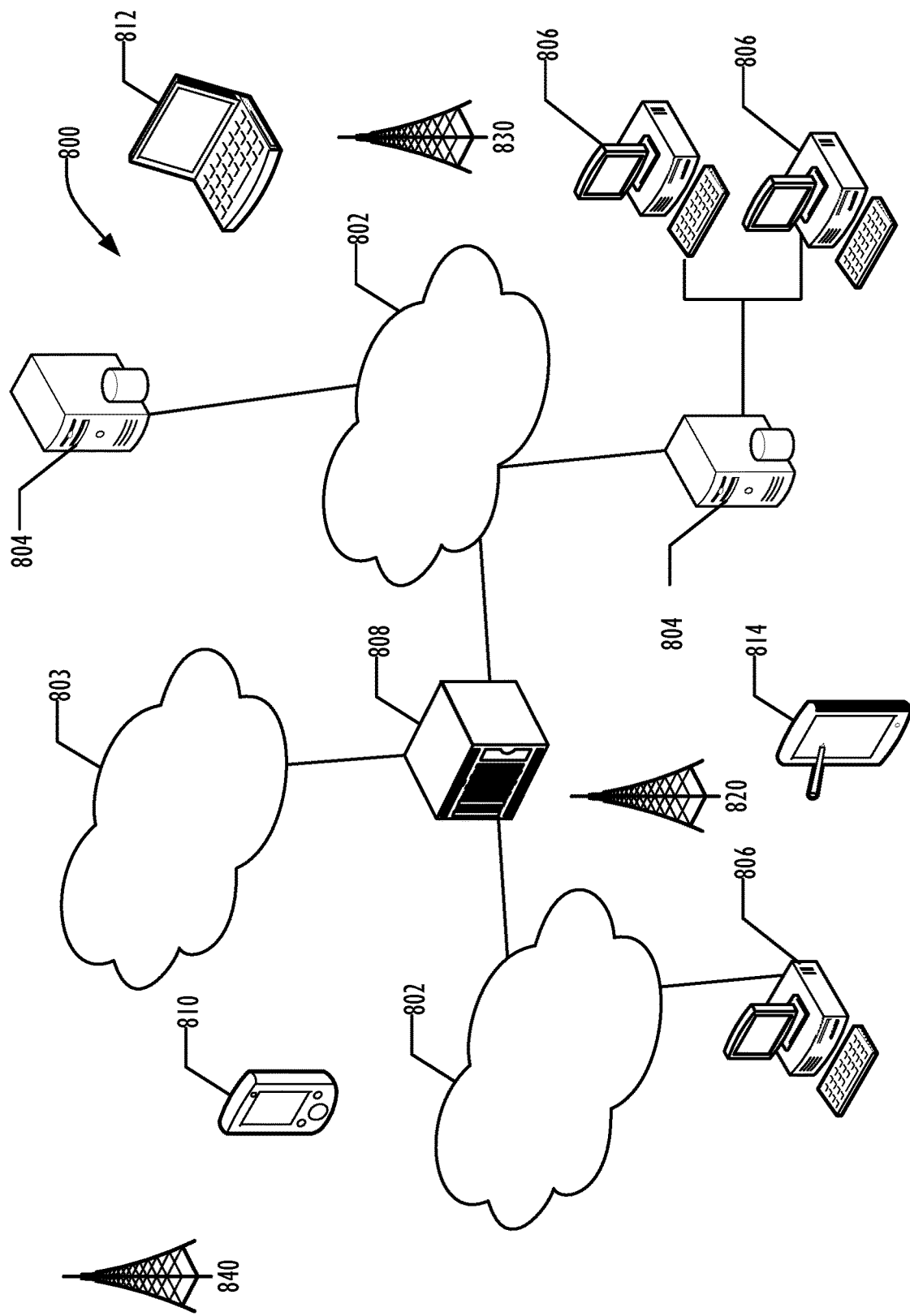
FIG. 8 is a block diagram illustrating an infrastructure in which the techniques described herein may be implemented according to one embodiment.

Referring now to FIG. 8, an example infrastructure 800 in which the techniques described above may be implemented is illustrated schematically. Infrastructure 800 contains computer networks 802. Computer networks 802 may include many different types of computer networks available today, such as the Internet, a corporate network or a Local Area Network (LAN). Each of these networks can contain wired or wireless programmable devices and operate using any number of network protocols (e.g., TCP/IP). Networks 802 may be connected to gateways and routers (represented by 808), end user computers 806, and computer servers 804. For example, in some embodiments the persistence analysis described above is largely performed on the end user computers 806 or mobile devices 810, 812, and 814, while computer servers 804 provide reputation services via the networks 802 or cellular networks 803. Other embodiments may provide at least some reputation services on the local end user computers 806 or mobile devices 810, 812, and 814. Infrastructure 800 also includes cellular network 803 for use with mobile communication devices. Mobile cellular networks support mobile phones and many other types of mobile devices. Mobile devices in the infrastructure 800 are illustrated as mobile phones 810, laptops 812 and tablets 814. A mobile device such as mobile phone 810 may interact with one or more mobile provider networks as the mobile device moves, typically interacting with a plurality of mobile network towers 820, 830, and 840 for connecting to the cellular network 803. Although referred to as a cellular network in FIG. 8, a mobile device may interact with towers of more than one provider network, as well as with multiple non-cellular devices such as wireless access points and routers 808. In addition, the mobile devices 810, 812 and 814 may interact with non-mobile devices such as computers 804 and 806 for desired services.

The following examples pertain to further embodiments.

Example 1 is a machine readable medium, on which are stored instructions for improving detection of malware, comprising instructions that when executed cause a machine to: configure a hardware performance monitoring unit of a processing element of the machine to generate an interrupt upon a predetermined event; determine whether a page corresponding to the interrupt has been modified since loading into memory; queue a trigger object responsive to a determination that the page has been modified since loading into memory; and trigger a client routine by the trigger object to perform anti-malware analysis of the page.

In Example 2 the subject matter of Example 1 optionally includes wherein the instructions that when executed cause the machine to determine whether the page has been modified since loading into memory comprise instructions that when executed cause the machine to: examine a page table entry maintained by the processing element; and determine the page has been modified based on an indication in the page table entry.

In Example 3 the subject matter of any of Examples 1-2 optionally includes wherein the instructions further comprise instructions that when executed cause the machine to: determine whether code present in the page has been whitelisted or has been generated by a whitelisted module; and ignore the page responsive to a determination that the page has been whitelisted or has been generated by the whitelisted module.

In Example 4 the subject matter of any of Examples 1-2 optionally includes wherein the instructions further comprise instructions that when executed cause the machine to: determine whether the page has changed since a previous analysis of the page; and ignore the page responsive to a determination that the page has not changed since the previous analysis of the page.

In Example 5 the subject matter of Example 4 optionally includes wherein the instructions that when executed cause the machine to determine whether the page has changed since the previous analysis of the page comprise instructions that when executed cause the machine to: calculate a hash of the page; determine whether the hash of the page is in a hash table of previously examined pages; and determine that the page has not changed since the previous analysis of the page responsive to a determination that the hash of the page is in the hash table.

In Example 6 the subject matter of any of Examples 1-2 optionally includes wherein the instructions that when executed cause the machine to determine whether the page corresponding to the interrupt has been modified since loading into memory are performed by an interrupt service routine, and wherein the instructions that when executed cause the machine to queue a trigger object are performed by a routine executing at a priority lower than the interrupt service routine.

In Example 7 the subject matter of any of Examples 1-2 optionally includes wherein the instructions that when executed cause the machine to queue a trigger object comprise instructions that when executed cause the machine to queue the trigger object on a trigger queue maintained by a kernel of an operating system of the machine.

In Example 8 the subject matter of any of Examples 1-2 optionally includes wherein the predetermined event is execution of a call or jump instruction.

Example 9 is a method of improving detection of malware, comprising: configuring a hardware performance monitoring unit of a processing element of a programmable device to generate an interrupt upon a predetermined event; queuing a trigger object responsive to determining that a page corresponding to the interrupt has been modified since loading into memory; and triggering a client routine by the trigger object to perform an anti-malware analysis of the page.

In Example 10 the subject matter of Example 9 optionally includes wherein determining that the page has been modified since loading into memory comprises: examining a hardware-maintained page table entry; and determining the page has been modified since loading into memory based on an indication in the page table entry.

In Example 11 the subject matter of any of Examples 9-10 optionally includes further comprising: determining whether an executing process associated with the page has been blacklisted; and ignoring the page responsive to a determination that the page has not been blacklisted.

In Example 12 the subject matter of any of Examples 9-10 optionally includes further comprising: determining whether the page has changed since a previous examination of the page; and ignoring the page responsive to a determination that the page has not changed since the previous examination.

In Example 13 the subject matter of Example 12 optionally includes wherein determining whether the page has changed comprises: generating a hash of the page; and determining whether the hash is in a hash table of previously examined pages.

In Example 14 the subject matter of any of Examples 9-10 optionally includes wherein determining whether the page corresponding to the interrupt is performed by an interrupt service routine, and wherein queuing a trigger object is performed by a routine executing at a priority lower than the interrupt service routine.

In Example 15 the subject matter of any of Examples 9-10 optionally includes wherein queuing the trigger object comprises queue the trigger object on a trigger queue maintained by a kernel of an operating system of the programmable device.

In Example 16 the subject matter of any of Examples 9-10 optionally includes wherein the predetermined event is execution of a call or jump instruction.

In Example 17 the subject matter of any of Examples 9-10 optionally includes wherein configuring the hardware performance monitoring unit comprises: configuring the hardware performance monitoring unit to generate the interrupt only upon a predetermined plurality of occurrences of the predetermined event.

Example 18 is a programmable device programmed for an improved detection of malware, comprising: a processing element having a hardware performance monitoring unit; a memory, coupled to the processing element, on which are stored instructions for detecting modification of executable code, comprising instructions that when executed cause the processing element to: configure the hardware performance monitoring unit to generate an interrupt upon a predetermined event; determine whether a page corresponding to the interrupt has been modified since loading into memory; queue a trigger object responsive to a determination that the page has been modified since loading into memory; and trigger a client routine by the trigger object to perform anti-malware analysis of the page.

In Example 19 the subject matter of Example 18 optionally includes wherein the instructions that when executed cause the processing element to determine whether the page has been modified since loading into memory comprise instructions that when executed cause the processing element to: examine a page table entry maintained by the processing element; and determine the page has been modified since loading into memory based on an indication in the page table entry.

In Example 20 the subject matter of any of Examples 18-19 optionally includes wherein the instructions further comprise instructions that when executed cause the processing element to: determine whether code present in the page has been whitelisted or has been generated by a whitelisted module; and ignore the page responsive to a determination that the executing process has been whitelisted.

In Example 21 the subject matter of any of Examples 18-19 optionally includes further comprising instructions that when executed cause the processing element to: determine whether the page has changed since a previous analysis of the page; and ignore the page responsive to a determination that the page has not changed since the previous analysis of the page.

In Example 22 the subject matter of Example 21 optionally includes wherein the instructions that when executed cause the processing element to determine whether the page has changed since the previous analysis of the page comprise instructions that when executed cause the processing element to: calculate a hash of the page; determine whether the hash of the page is in a hash table of previously examined pages; and determine that the page has not changed since the previous analysis of the page responsive to a determination that the hash of the page is in the hash table.

In Example 23 the subject matter of any of Examples 18-19 optionally includes wherein the instructions that when executed cause the processing element to determine whether the page corresponding to the interrupt has been modified since loading into memory are performed by an interrupt service routine, and wherein the instructions that when executed cause the processing element to queue a trigger object are performed by a routine executing at a priority lower than the interrupt service routine.

In Example 24 the subject matter of any of Examples 18-19 optionally includes wherein the instructions that when executed cause the processing element to queue a trigger object comprise instructions that when executed cause the processing element to queue the trigger object on a trigger queue maintained by a kernel of an operating system of the processing element.

In Example 25 the subject matter of any of Examples 18-19 optionally includes wherein the predetermined event is execution of a predetermined number of call or jump instructions.

Example 26 is a programmable device adapted for improving detection of malware, comprising: means for configuring a hardware performance monitoring unit of a processing element of the machine to generate an interrupt upon a predetermined event; means for determining whether a page corresponding to the interrupt has been modified since loading into memory; means for queuing a trigger object responsive to a determination that the page has been modified since loading into memory; and means for triggering a client routine by the trigger object to perform anti-malware analysis of the page.

In Example 27 the subject matter of Example 26 optionally includes wherein the means for determining whether the page has been modified comprise: means for examining a page table entry maintained by the processing element; and means for determining the page has been modified since loading into memory based on an indication in the page table entry.

In Example 28 the subject matter of any of Examples 26-27 optionally includes further comprising: means for determining whether code present in the page has been whitelisted or has been generated by a whitelisted module; and means for ignoring the page responsive to a determination that the page has been whitelisted or has been generated by the whitelisted module.

In Example 29 the subject matter of any of Examples 26-27 optionally includes further comprising: means for determining whether the page has changed since a previous analysis of the page; and means for ignoring the page responsive to a determination that the page has not changed since the previous analysis of the page.

In Example 30 the subject matter of Example 29 optionally includes wherein the means for determining whether the page has changed since the previous analysis of the page comprise: means for calculating a hash of the page; means for determining whether the hash of the page is in a hash table of previously examined pages; and means for determining that the page has not changed since the previous analysis of the page responsive to a determination that the hash of the page is in the hash table.

In Example 31 the subject matter of any of Examples 26-27 optionally includes wherein the means for determining whether the page corresponding to the interrupt has been modified since loading into memory are performed by an interrupt service routine, and wherein the means for queuing a trigger object are performed by a routine executing at a priority lower than the interrupt service routine.

In Example 32 the subject matter of any of Examples 26-27 optionally includes wherein the means for queuing a trigger object comprise means for queuing the trigger object on a trigger queue maintained by a kernel of an operating system of the machine.

In Example 33 the subject matter of any of Examples 26-27 optionally includes wherein the predetermined event is execution of a call or jump instruction.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A first storage device or first storage disk comprising first executable instructions that, when executed, cause a processor to at least:
   in response to an interrupt from a performance monitoring unit after a memory page including second executable instructions has been loaded into local memory from a second storage device and has been accessed from the local memory, determine whether the second executable instructions of the memory page have been modified thereby changing the memory page into a modified memory page; and
   in response to the second executable instructions of the modified memory page having been modified, trigger a client routine to perform anti-malware analysis of at least a portion of the modified memory page before the modified memory page is written back to the second storage device.

2. The first storage device or the first storage disk of claim 1, wherein the first executable instructions, when executed, cause the processor to determine whether the second executable instructions of the memory page have been modified by:
   examining a page table entry maintained by the processor; and
   determining that the second executable instructions of the memory page have been modified based on the page table entry.

3. The first storage device or the first storage disk of claim 1, wherein the first executable instructions, when executed, cause the processor to:
   determine whether the second executable instructions of the memory page have been whitelisted or have been generated by a whitelisted module; and
   refrain from triggering the client routine to perform the anti-malware analysis of the memory page when the second executable instructions of the memory page have been whitelisted or have been generated by the whitelisted module.

4. The first storage device or the first storage disk of claim 1, wherein the first executable instructions, when executed, cause the processor to:
   determine whether the second executable instructions of the modified memory page have changed since a previous analysis of the modified memory page; and
   refrain from triggering the client routine to perform the anti-malware analysis of the modified memory page when the second executable instructions of the modified memory page have not changed since the previous analysis of the memory page.

5. The first storage device or the first storage disk of claim 1, wherein the first executable instructions, when executed, cause the processor to determine whether the second executable instructions of the memory page have been modified by:
   calculating a hash of the memory page;
   determining whether the hash is in a hash table of previously examined memory pages; and
   determining that the second executable instructions of the memory page have not been modified when the hash is in the hash table.

6. The first storage device or the first storage disk of claim 1, wherein the first executable instructions cause the processor to execute a first routine at a first priority to determine whether the second executable instructions of the memory page have been modified and to execute a second routine at a second priority lower than the first priority.

7. The first storage device or the first storage disk of claim 6, wherein the first executable instructions, when executed, cause the processor to queue a trigger object on a trigger queue maintained by a kernel of an operating system associated with the processor.

8. The first storage device or the first storage disk of claim 1, wherein the second executable instructions of the memory page include a call or jump instruction.

9. A method of improving detection of malware, the method comprising:
   in response to an interrupt from a performance monitoring unit after a memory page including executable instructions has been loaded into local memory from a storage device and has been accessed from the local memory, determining whether the executable instructions of the memory page have been modified thereby changing the memory page into a modified memory page; and
   in response to the executable instructions of the modified memory page having been modified, performing anti-malware analysis of at least a portion of the modified memory page before the modified memory page is written back to the storage device.

10. The method of claim 9, further including:
    examining a hardware-maintained page table entry; and
    determining the executable instructions of the memory page have been modified based on the page table entry.

11. The method of claim 9, further including:
    determining whether the executable instructions associated with the memory page have been blacklisted; and
    ignoring the memory page when the executable instructions have not been blacklisted.

12. The method of claim 9, further including:
    determining whether the executable instructions of the modified memory page have changed since a previous examination of the modified memory page; and
    ignoring the modified memory page when the executable instructions of the modified memory page have not changed since the previous examination.

13. The method of claim 9, further including:
    generating a hash of the memory page;
    determining whether the hash is in a hash table of previously examined memory pages; and
    determining that the executable instructions of the memory page have not been modified when the hash is in the hash table.

14. The method of claim 9, further including executing a first routine at a first priority to determine whether the executable instructions of the memory page have been modified, and executing a second routine at a second priority to queue a trigger object to trigger the anti-malware analysis, the second priority lower than the first priority.

15. The method of claim 14, further including queuing the trigger object on a trigger queue maintained by a kernel of an operating system associated with the performance monitoring unit.

16. The method of claim 9, wherein the executable instructions of the memory page include a call or jump instruction.

17. The method of claim 16, further including generating the interrupt only upon a threshold plurality of occurrences of the call or jump instruction.

18. A programmable device to detect malware, the programmable device comprising:
    a processor; and
    a memory including first executable instructions that, when executed, cause the processor to:
       in response to an interrupt from a performance monitoring unit after a memory page including second executable instructions has been loaded into local memory from a storage device and has been accessed from the memory, determine whether the second executable instructions of the memory page have been modified thereby changing the memory page into a modified memory page; and
       in response to the second executable instructions of the modified memory page having been modified, trigger a client routine to perform anti-malware analysis of at least a portion of the modified memory page before the modified memory page is written back to the storage device.

19. The programmable device of claim 18, wherein the processor is to determine whether the second executable instructions of the memory page have been modified by examining a page table entry maintained by the processor.

20. The programmable device of claim 18, wherein the processor is to:
    determine whether the second executable instructions have been whitelisted or have been generated by a whitelisted module; and
    ignore the modified memory page when the second executable instructions have been whitelisted.

21. The programmable device of claim 18, wherein the processor is to:
    determine whether the second executable instructions of the modified memory page have changed since a previous analysis of the modified memory page; and
    ignore the modified memory page when the second executable instructions of the modified memory page have not changed since the previous analysis of the modified memory page.

22. The programmable device of claim 21, wherein the processor is to determine whether the second executable instructions of the modified memory page have changed by:
    calculating a hash of the modified memory page;
    determining whether the hash is in a hash table of previously examined memory pages; and
    determining that the second executable instructions of the modified memory page have not changed when the hash is in the hash table.

23. The programmable device of claim 18, wherein the processor is to execute a first routine at a first priority to determine whether the second executable instructions of the memory page have been modified, and to execute a second routine at a second priority to queue a trigger object to trigger the client routine, the second priority lower than the first priority.

24. The programmable device of claim 23, wherein the processor is to queue the trigger object on a trigger queue maintained by a kernel of an operating system associated with the processor.

25. The programmable device of claim 18, wherein the second executable instructions include call or jump instructions.

* * * * *